US012349733B2

(12) United States Patent
Mironov

(10) Patent No.: US 12,349,733 B2
(45) Date of Patent: Jul. 8, 2025

(54) SUSCEPTOR ASSEMBLY COMPRISING ONE OR MORE COMPOSITE SUSCEPTOR PARTICLES

(71) Applicant: Philip Morris Products S.A., Neuchatel (CH)

(72) Inventor: Oleg Mironov, Cudrefin (CH)

(73) Assignee: Philip Morris Products S.A., Neuchatel (CH)

( * ) Notice: Subject to any disclaimer, the term of this patent is extended or adjusted under 35 U.S.C. 154(b) by 309 days.

(21) Appl. No.: 18/000,498

(22) PCT Filed: Jun. 3, 2021

(86) PCT No.: PCT/EP2021/064912
§ 371 (c)(1),
(2) Date: Dec. 1, 2022

(87) PCT Pub. No.: WO2021/245190
PCT Pub. Date: Dec. 9, 2021

(65) Prior Publication Data

US 2023/0210185 A1 Jul. 6, 2023

(30) Foreign Application Priority Data

Jun. 5, 2020 (EP) .................................... 20178515

(51) Int. Cl.
*A24F 40/465* (2020.01)
*A24D 1/20* (2020.01)
(Continued)

(52) U.S. Cl.
CPC .............. *A24F 40/465* (2020.01); *A24D 1/20* (2020.01); *A24F 40/20* (2020.01); *H05B 6/105* (2013.01);
(Continued)

(58) Field of Classification Search
None
See application file for complete search history.

(56) References Cited

U.S. PATENT DOCUMENTS 7,731,648 B2 6/2010 Ivkov
2016/0295921 A1 10/2016 Mironov et al.
(Continued)

FOREIGN PATENT DOCUMENTS

CA 3105440 A1 * 12/2019 ............. A24B 15/12
JP 2017 520234 A 7/2017
(Continued)

OTHER PUBLICATIONS

Combined Russian Office Action and Search Report issued Oct. 9, 2021 in Russia Patent Application No. 2022134282/07 (with English Translation of Office Action only), 16 pages.
(Continued)

*Primary Examiner* — Cynthia Szewczyk
(74) *Attorney, Agent, or Firm* — Oblon, McClelland, Maier & Neustadt, L.L.P.

(57) ABSTRACT

A susceptor assembly is provided for inductively heating an aerosol-forming substrate under an influence of an alternating magnetic field, the susceptor assembly including: one or more composite susceptor particles, each one of the one or more composite susceptor particles including a particle core and a particle shell entirely encapsulating the particle core, in which the particle core includes or is made of a ferromagnetic or ferrimagnetic core material having a relative magnetic permeability of at least 200 for frequencies up to 10 kHz at a temperature of 20 degrees Celsius, and in which the particle shell includes or is made of an electrically conductive shell material. An aerosol-generating article for
(Continued)

Figure 1:
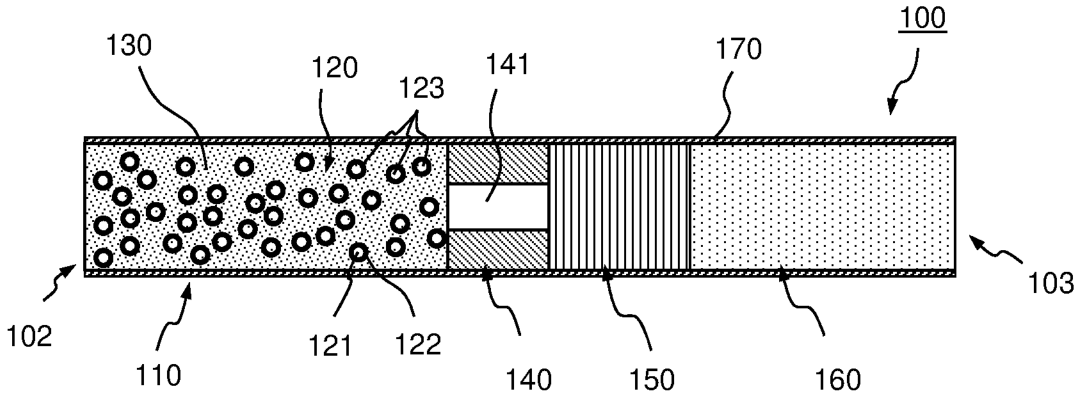

an inductively heating aerosol-generating device, and an aerosol-generating system including an aerosol-generating article, are also provided.

20 Claims, 2 Drawing Sheets

(51) Int. Cl.
*A24F 40/20* (2020.01)
*H05B 6/10* (2006.01)
*A24F 40/70* (2020.01)

(52) U.S. Cl.
CPC ........ *A24F 40/70* (2020.01); *H05B 2206/023* (2013.01)

(56) References Cited

U.S. PATENT DOCUMENTS

| | | | |
|---|---|---|---|
| 2018/0289067 A1 | | 10/2018 | Courbat et al. |
| 2018/0295885 A1 | | 10/2018 | Rojo-Calderon et al. |
| 2018/0317286 A1 | | 11/2018 | Rojo-Calderon et al. |
| 2019/0216133 A1 | * | 7/2019 | Fursa .................... A24F 40/465 |
| 2020/0138098 A1 | | 5/2020 | Mironov et al. |

FOREIGN PATENT DOCUMENTS

| | | | | | |
|---|---|---|---|---|---|
| RU | 2 680 438 | C2 | | 2/2019 | |
| WO | WO 2015/177264 | A1 | | 11/2015 | |
| WO | WO 2017/068093 | A1 | | 4/2017 | |
| WO | WO 2018/178217 | A1 | | 10/2018 | |
| WO | WO 2019/030361 | A1 | | 2/2019 | |
| WO | WO-2019129693 | A1 | * | 7/2019 | ............. A24B 15/10 |
| WO | WO 2019/224380 | A1 | | 11/2019 | |
| WO | WO 2020/064682 | A1 | | 4/2020 | |

OTHER PUBLICATIONS

International Search Report & Written Opinion issued Aug. 24, 2021 in PCT/EP2021/064912 filed on Jun. 3, 2021, 12 pages.

Japanese Office Action issued Mar. 6, 2025 in corresponding Japanese Patent Application No. 2022-574713, with English Machine Translation, 5 pages, citing documents 15-16 therein.

* cited by examiner

SUSCEPTOR ASSEMBLY COMPRISING ONE OR MORE COMPOSITE SUSCEPTOR PARTICLES

The present disclosure relates to a susceptor assembly comprising one or more composite susceptor particles for inductively heating an aerosol-forming substrate under the influence of an alternating magnetic field. The disclosure further relates to an aerosol-generating article comprising such a susceptor assembly as well as to an aerosol-generating system comprising such an article and an aerosol-generating device. In addition, the disclosure relates to a method of manufacturing such a susceptor assembly.

Generating inhalable aerosols by inductively heating aerosol-forming substrates is generally known from prior art. For this, the substrate may be arranged in thermal proximity or direct physical contact with a susceptor which is capable to generate heat due to at least one of eddy currents or hysteresis losses when it is exposed to an alternating magnetic field. For example, the susceptor may comprise one or more susceptor particles embedded in the aerosol-forming substrate. Together, the substrate and the susceptor may be part of an aerosol-generating article which is configured to be inserted into an aerosol-generating device comprising an induction source for generating the alternating magnetic field.

For controlling the temperature of the substrate, susceptor assemblies have been proposed which comprise a first and a second susceptor made of different materials. The first susceptor material may be optimized with regard to heat loss and thus heating efficiency. In contrast, the second susceptor material may be used as temperature marker. For this, the second susceptor material is chosen such as to have a Curie temperature corresponding to a predefined operating temperature of the susceptor assembly. At its Curie temperature, the magnetic properties of the second susceptor change from ferromagnetic or ferrimagnetic to paramagnetic, accompanied by a temporary change of its electrical resistance. Thus, by monitoring a corresponding change of the electrical current absorbed by the induction source it can be detected when the second susceptor material has reached its Curie temperature and, thus, when the predefined operating temperature has been reached. In order to avoid rapid overheating, the heating process has to be controlled by actively reducing or switching off the heating power, when the operating temperature has reached.

It would be desirable to have a susceptor assembly, an aerosol-generating article and an aerosol-generating system with the advantages of prior art solutions, whilst mitigating their limitations. In particular, it would be desirable to have a susceptor assembly, an aerosol-generating article and an aerosol-generating device system having an improved heating efficiency and improved temperature control capabilities.

According to an aspect of the present invention, there is provided a susceptor assembly for inductively heating an aerosol-forming substrate under the influence of an alternating magnetic field. The susceptor assembly comprises one or more composite susceptor particles. Each one of the one or more susceptor particles comprises a particle core and a particle shell entirely encapsulating the particle core. The particle core comprises or is made of a ferromagnetic or ferrimagnetic core material having a relative magnetic permeability of at least 200 at a frequency of 10 kHz (kilo-Hertz), in particular for frequencies up to 10 kHz (kilo-Hertz), and at a temperature of 20 degree Celsius. That is, the particle core comprises or is made of a ferromagnetic or ferrimagnetic core material having a relative magnetic permeability of at least 200 when penetrated by an alternating magnetic field with a frequency of 10 kHz (kilo-Hertz), in particular a frequencies up to 10 kHz (kilo-Hertz), at a temperature of 20 degree Celsius. The particle shell comprises or is made of an electrically conductive shell material.

According to the invention, it has been found that susceptor particles comprising a magnetic core with a high magnetic permeability and an electrically conductive shell provide both, an improved heating efficiency and improved temperature control with self-regulating properties. To this extent, it has been found that a magnetic core with a high magnetic permeability acts as a flux concentrator which increases the magnetic flux through the particle shell. According to Faraday's law of induction, an increase of the magnetic flux causes an increase of the electromotive force around a closed path through the electrically conductive shell material which in turn causes an increase of eddy current losses in the particle shell. Hence, the high magnetic permeability of the magnetic core increases the amount of heat generated in particle shell during use. Advantageously, this also allows to make the particle shell rather thin, and thus to save material and costs for the manufacturing of the susceptor particles.

Moreover, it has been found that the magnetic core may be used to control the amount of generated in particle shell as a function of the actual temperature of the susceptor assembly. This is due to the fact that the magnetic properties of the particle core change from ferromagnetic or ferrimagnetic to paramagnetic at the Curie temperature of the core material. As a consequence, the overall effective magnetic permeability of the composite susceptor particle drops to unity, when the susceptor assembly reaches the Curie temperature of the core material. This causes a stop of the heat generation in the particle core due to hysteresis losses as the magnetic hysteresis of the core material disappears. Even more, the change in the magnetic permeability also affects the heat generation in the particle shell as the decrease of the magnetic permeability causes a decrease of the magnetic flux through the electrically conductive shell. This in turn leads to a reduction of the electromotive force and thus to a reduction of heat generating eddy current losses in the particle shell, when the susceptor assembly reaches the Curie temperature of the core material. In addition, the skin depth of the particle shell—which is a measure of how far electrical conduction takes place in the electrically conductive shell material when being exposed to an alternating magnetic field—depends on the overall effective magnetic permeability of the composite susceptor particle. Hence, a decrease of the overall effective magnetic permeability of the susceptor particle caused a decreasing magnetic permeability in the particle core leads to an increase of the skin depth in the shell. This in turn causes the effective resistance of the electrically conductive particle shell to decrease. As a consequence, when reaching the Curie temperature of the core material, heat generation in the particle shell is also reduced due to the decrease of the effective resistance also causing a reduction of eddy current losses in the shell material. Accordingly, at the Curie temperature, the heat generation by eddy current losses in the particle shell is reduced due to both, a reduction of the magnetic flux through the particle shell and a reduction of the effective resistance of the shell material. In addition, the overall heat generation is reduced due to the hysteresis losses in the particle core disappearing at the Curie temperature of the core material. Most importantly, the reduction of the overall heat generation results by itself when the susceptor assembly reaches the Curie temperature of the core material. As a result, rapid overheating of the aerosol-forming substrate can be effectively avoided, preferably without the need for an active temperature control.

Moreover, the heating efficiency of the composite susceptor particles according to the present invention is larger than of a susceptor particle only being made of the ferromagnetic or ferrimagnetic core material. This is due to the shell material in which a major part of the heat is generated due to the enhanced eddy current losses.

The shell material may be paramagnetic. In this case, heat generation in the electrically conductive shell material is only caused by eddy currents. Likewise, the shell material may be ferromagnetic or ferrimagnetic. As a consequence, heat may be generated in the shell material also by hysteresis losses. Advantageously, this increases the heating efficiency of the susceptor assembly. Preferably, if magnetic, a Curie temperature of the shell material preferably is lower than or equal to a Curie temperature of the ferromagnetic or ferrimagnetic core material. Advantageously, this ensures that heat generation in the shell material due to hysteresis losses only occurs below or up to the Curie temperature of the core material, that is, only below or up to a predefined operating temperature. It is also possible that the Curie temperature of the shell material is higher than the Curie temperature of the ferromagnetic or ferrimagnetic core material.

The shell material may be one of aluminum, stainless steel, electrically conductive carbon, or bronze. Aluminum is particularly suitable as it allows for sintering at low temperatures which in turn may facilitate the manufacturing of the composite susceptor particles, as will be described in more detail below.

Preferably, the core material is electrically non-conductive. In this case, heat generation in the core material is only caused by hysteresis losses. As a consequence, when reaching the Curie temperature of the core material, heat generation in the susceptor core completely stops. This proves particularly beneficial with regard to a self-regulating temperature control of the susceptor assembly. It is also possible that the core material is electrically conductive.

As mentioned above, the Curie temperature of the core material preferably corresponds to predefined operating temperature of the susceptor assembly. The actual operating temperature depends on the specific type of the aerosol-forming substrate to be heated. For solid aerosol forming substrates containing tobacco material, the operating temperature may be in a range between 200 degree Celsius and 360 degree Celsius. For gel-like aerosol forming substrates, the operating temperature may be in a range between 160 degree Celsius and 240 degree Celsius. Accordingly, the core material may have a Curie temperature in a range between 160 degree Celsius and 400, in particular between 160 degree Celsius and 360 degree Celsius, preferably between 200 degree Celsius and 360 degree Celsius or between 160 degree Celsius and 240 degree Celsius.

The heating efficiency of the susceptor assembly increases with higher values of the relative magnetic permeability. Therefore, the core material may have a relative magnetic permeability even higher than 200. Accordingly, the core material may have a relative magnetic permeability of at least 300 or at least 400 or at least 500 or at least 700, in particular of at least 1000, preferably of at least 10000 or of at least 50000 or at least 80000. These values refer to the maximum values of the relative magnetic permeability at a frequency of 10 kHz (kilo-Hertz), in particular for frequencies up to 10 kHz (kilo-Hertz), and a temperature of 25 degrees Celsius. As will be described further below, the alternating magnetic field used to inductively heat the susceptor assembly may be in a range between 500 kHz (kilo-Hertz) and 30 MHz (Mega-Hertz), in particular between 5 MHz (Mega-Hertz) and 15 MHz (Mega-Hertz), preferably between 5 MHz (Mega-Hertz) and 10 MHz (Mega-Hertz). For these frequencies, the minimum relative magnetic permeability of the core material may be lower. For example, the core material may have a relative magnetic permeability of at least 80, in particular at least 100, preferably at least 120 at a frequency of 7 MHz (Mega-Hertz) and a temperature of 25 degrees Celsius. Likewise, the core material may have a relative magnetic permeability of at least 40, in particular at least 50, preferably at least 60 at a frequency of 15 MHz (Mega-Hertz) and a temperature of 25 degrees Celsius.

The core material may comprise or may be a ferrite, in particular a ferrite powder. As used herein, a ferrite is a ceramic material made by mixing and firing large proportions of iron(III) oxide ($Fe_2O_3$) blended with small proportions of one or more additional metallic elements, such as barium, manganese, nickel, and zinc.

As an example, the core material may be one of a manganese-magnesium ferrite, a nickel-zinc ferrite or a cobalt-zinc barium ferrite.

For example, the core material may comprise or may consist of a composition of the type $Mg_x\ Mn_y\ Fe_z\ O_4$, wherein x=0.4-1.1, y=0.3-0.9, and z=1-2, and wherein the atomic fraction x, y and z of the metallic cations Mg, Mn and Fe is such that the total charge of the metallic cations equilibrates the total charge of the oxygen anions. In particular, the core material may comprise or may be one of:

$Mg_{0.77}\ Mn_{0.58}\ Fe_{1.65}\ O_4$, having a Curie temperature of about 270 degree Celsius;

$Mg_{0.55}\ Mn_{0.88}\ Fe_{1.55}\ O_4$; having a Curie temperature of about 262 degree Celsius;

$Mg_{1.03}\ Mn_{0.35}\ Fe_{1.37}\ O_4$; having a Curie temperature of about 190 degree Celsius.

The nickel-zinc ferrite—as mentioned above—may comprise or may consist of a composition of the type $Ni_x\ Zn_{1-x}\ Fe_2\ O_4$, wherein x=0.3-0.7 and the atomic fraction of the metallic cations Ni, Zn and Fe is such that the total charge of the metallic cations equilibrates the total charge of the oxygen anions. In particular, the open-porous inductively heatable ceramic material may comprise or may be for example $Ni_{0.5}\ Zn_{0.5}\ Fe_2\ O_4$, having a Curie temperature of about 258 degree Celsius.

The cobalt-zinc barium ferrite—as mentioned above—may comprise or may consist of $Co_{1.75}\ Zn_{0.25}\ Ba_2\ Fe_{12}\ O_{22}$, having a Curie temperature of about 279 degree Celsius.

Advantageously, ferrites are easy and inexpensive to manufacture. In addition, ferrites are electrically non-conductive. Accordingly, heat generation in the core material is only due to hysteresis losses and thus self-regulating, when reaching the Curie temperature. Moreover, ferrites are inert and thus uncritical with regard to a use in aerosol generating articles comprising aerosol-forming substrates.

The particle core preferably is solid particle core. In particular, the particle core may have a ball shape. Likewise, the particle shell preferably may be a solid particle shell. In particular, the particle may be a spherical shell.

Each one of the one or more susceptor particles may have an equivalent particle diameter in a range between 10 micrometer and 500 micrometer, in particular between 20 micrometer and 250 micrometer, more particularly between 35 micrometer and 75 micrometer, for example 55 micrometer. The equivalent spherical diameter is used in combination with particles of irregular shape and is defined as the diameter of a sphere of equivalent volume. The particle size may depend inter alia on the aerosol-forming substrate to be heated. In addition, for safety reasons the particle size should by large enough so that the susceptor particles do not pass a filter of an aerosol-generating article the susceptor particles might be used in. Accordingly, each one of the one or more susceptor particles may have a particle diameter of at least 20 micrometer, preferably of at least 35 micrometer.

Accordingly, the particle core may have an equivalent spherical core diameter in a range between 5 micrometer and 499 micrometer, in particular between 15 micrometer and 220 micrometer, more particularly between 30 micrometer and 55 micrometer, for example 35 micrometer. The equivalent particle diameter mainly may be given by the equivalent spherical core diameter. An equivalent spherical core diameter in a range between 30 micrometer and 55 micrometer is particularly suitable as such particles are small enough such that that they are hardly visible in the substrate, but still large enough such that they do not pass a filter of an aerosol-generating article the susceptor particles might be used in.

Due to the flux enhancing effect of the core material in the shell, the shell thickness may be rather small. Advantageously, this enables material and cost savings for the manufacturing of the susceptor particles. The particle shell may have a shell thickness in a range between 2.5 micrometer and 15 micrometer, in particular between 5 micrometer and 12 micrometer, for example 10 micrometer. The shell thickness may—inter alia—depend on the material of the particle shell, in particular on the inductive heating rate and material specific requirements for the production of the shell. For example, the shell thickness may be 10 micrometer for aluminum, whereas the shell thickness may be below 10 micrometer for steel. Larger values of the shell thickness are particularly suitable for particle shells having a porous or sintered structure.

The above values may refer to the mean core diameter, the mean shell thickness and the mean particle diameter of all susceptor particles of the susceptor assembly. Accordingly, it is possible that the some susceptor particles have at least one of a smaller core diameter, a smaller shell thickness or a smaller particle diameter than other susceptor particles of the susceptor assembly.

Preferably, the particle shell is in physical contact with the particle core. This enables a good heat exchange between the particle shell and the particle core such that the particle shell and the particle core are at about the same temperature.

The particle core may be a sintered particle core. In particular, the core material may be a sintered material. Sintering is the process of compacting and forming a solid mass of material by heat or pressure without melting it to the point of liquefaction. Advantageously, sintering allows for producing particle cores having almost any shape and dimensions. Sintering also results in susceptor particles which have good strength properties. In addition, a sintered particle core facilitates a good bond between the particle shell and the particle core.

Accordingly, the particle shell preferably is firmly bonded to the particle core. That is, there may be a substance-to-substance bond between the particle shell and the particle core. A firm bond provides a good mechanical stability and good heat exchange between the particle shell and the particle core.

In particular, the shell material may be plated, deposited, coated or cladded onto the particle core such as to form the particle shell.

The susceptor assembly according to the present invention is preferably configured to be driven by an alternating, in particular high-frequency magnetic field. As referred to herein, the high-frequency magnetic field may be in a range between 500 kHz (kilo-Hertz) and 30 (Mega-Hertz), in particular between 5 MHz (Mega-Hertz) and 15 MHz (Mega-Hertz), preferably between 5 MHz (Mega-Hertz) and 10 MHz (Mega-Hertz).

The susceptor particle may comprise a cover, in particular a protective cover. The cover may be formed by a glass, a ceramic, or an inert metal, formed or coated over at least a portion of the susceptor particles, respectively. Advantageously, the cover may be configured to at least one of: to avoid aerosol-forming substrate sticking to the surface of the susceptor assembly, or vice versa to increase the adhesion of aerosol-forming substrate, in particular liquid aerosol-forming substrate to the susceptor assembly, to provide a porous surface, in particular for storing a flavor substance or liquid aerosol-forming substrate, to provide a flavor substance or aerosolization enhancing cover, to avoid material diffusion, for example metal diffusion, from the susceptor materials into the aerosol-forming substrate, or to improve the mechanical strength of the susceptor particles. In order provide a flavor substance or aerosolization enhancing cover, the cover may comprise a flavor substance or aerosolization enhancing substance. Preferably, the cover is electrically non-conductive.

As used herein, the term "susceptor particle" refers to an element that is capable to convert electromagnetic energy into heat when subjected to an alternating magnetic field. This may be the result of at least one of hysteresis losses or eddy currents induced in the susceptor, particle depending on the electrical and magnetic properties of the materials comprised in the susceptor particle. Hysteresis losses occur in ferromagnetic or ferrimagnetic susceptor materials due to magnetic domains within the material being switched under the influence of an alternating electromagnetic field. Eddy currents may be induced if the susceptor material is electrically conductive. In case of an electrically conductive ferromagnetic or ferrimagnetic susceptor material, heat can be generated due to both, eddy currents and hysteresis losses.

According to another aspect of the present invention, there is provided an aerosol-generating article for use with an inductively heating aerosol-generating device. The article comprises at least one aerosol-forming substrate and a susceptor assembly according to the present invention and as described herein. The one or more susceptor particles of the susceptor assembly are embedded in the aerosol-forming substrate.

The susceptor particles may be distributed throughout the aerosol-forming substrate. The susceptor particles may be equally distributed throughout the aerosol-forming substrate, that is, homogenously. It is also possible that the susceptor particles are distributed throughout the aerosol-forming substrate with local concentration peaks or according to a concentration gradient, for example a distribution gradient from a central axis of the aerosol-forming article to the periphery thereof.

As used herein, the term "aerosol-generating article" refers to an article comprising at least one aerosol-forming substrate that, when heated, releases volatile compounds that can form an aerosol. Preferably, the aerosol-generating article is a heated aerosol-generating article. That is, an aerosol-generating article which comprises at least one aerosol-forming substrate that is intended to be heated rather than combusted in order to release volatile compounds that can form an aerosol. The aerosol-generating article may be a consumable, in particular a consumable to be discarded after a single use. For example, the article may be a cartridge including a gel-like aerosol-forming substrate to be heated. Alternatively, the article may be a rod-shaped article, in particular a tobacco article, resembling conventional cigarettes.

As used herein, the term "aerosol-forming substrate" denotes a substrate formed from or comprising an aerosol-forming material that is capable of releasing volatile compounds upon heating for generating an aerosol. The aerosol-forming substrate is intended to be heated rather than combusted in order to release the aerosol-forming volatile compounds. The aerosol-forming substrate may be a solid aerosol-forming substrate or a liquid aerosol-forming substrate or a gel-like aerosol-forming substrate, or any combination thereof. That is, the aerosol-forming substrate may comprise, for example, both solid and liquid components. The aerosol-forming substrate may comprise a tobacco-containing material containing volatile tobacco flavor compounds, which are released from the substrate upon heating. Alternatively or additionally, the aerosol-forming substrate may comprise a non-tobacco material. The aerosol-forming substrate may further comprise an aerosol former. Examples of suitable aerosol formers are glycerin and propylene glycol. The aerosol-forming substrate may also comprise other additives and ingredients, such as nicotine or flavorings. The aerosol-forming substrate may also be a paste-like material, a sachet of porous material comprising aerosol-forming substrate, or, for example, loose tobacco mixed with a gelling agent or sticky agent, which could include a common aerosol former such as glycerin, and which is compressed or molded into a plug.

As an example, the aerosol-generating article may comprise the following elements: a substrate element, a support element, a cooling element, and a filter element. All of the aforementioned elements may be sequentially arranged along a length axis of the article in the above described order, wherein the substrate element is arranged at a distal end of the article and the filter element is arranged at a proximal end of the article. In particular, the substrate element is located downstream the support element with regard to an airflow passing through the article in use of the system. Each of the aforementioned elements may be substantially cylindrical. In particular, all elements may have the same outer cross-sectional shape. In addition, the elements may be circumscribed by an outer wrapper such as to keep the elements together and to maintain the desired cross-sectional shape of the rod-shaped article. Preferably, the wrapper is made of paper.

The substrate element preferably comprise the at least one aerosol-forming substrate to be heated and the susceptor assembly, that is, the one or more susceptor particles embedded in the aerosol-forming substrate.

The support element may comprise a hollow cellulose acetate tube having a free central air passage.

The aerosol-cooling element may be an element having a large surface area and a low resistance to draw, for example 15 mmWG (millimeter water gauge) to 20 mmWG (millimeter water gauge). In use, an aerosol formed by volatile compounds released from the substrate element is drawn through the aerosol-cooling element before being transported to the proximal end of the aerosol-generating article.

The filter element preferably serves as a mouthpiece, or as part of a mouthpiece together with the aerosol-cooling element. As used herein, the term "mouthpiece" refers to a portion of the article through which the aerosol exits the aerosol-generating article.

According to another example, the aerosol-generating article may comprise the following elements: a distal support element, a substrate element, a proximal support element, a cooling element, and a filter element. All of the aforementioned elements may be sequentially arranged along a length axis of the article in the above described order, wherein the distal support element is arranged at a distal end of the article and the filter element is arranged at a proximal end of the article. That is, the substrate element is located between the proximal support element and the distal support element. In particular, the substrate element is located downstream the proximal support element and upstream the distal support element with regard to an airflow passing through the article in use. Each of the aforementioned elements may be substantially cylindrical. In particular, all elements may have the same outer cross-sectional shape. In addition, the elements may be circumscribed by an outer wrapper such as to keep the elements together and to maintain the desired cross-sectional shape of the rod-shaped article. Preferably, the wrapper is made of paper.

The substrate element, the cooling element and the filter element may correspond to the respective elements according to the aforementioned example.

The distal and the proximal support element may comprise a hollow cellulose acetate tube having a free central air passage. Alternatively, the distal support element may comprise a cellulose acetate plug (without a free central air passage). The cellulose acetate plug may be used to cover and protect the distal front end of the substrate element.

Further features and advantages of the aerosol-generating article according to the present invention have already been described above with regard to the susceptor assembly according to the present invention and equally apply.

According to another aspect of the present invention, there is provided an aerosol-generating system comprising an aerosol-generating article according to the present invention and as described herein as well as an inductively heating aerosol-generating device for use with the device.

As used herein, the term "inductively heating aerosol-generating device" is used to describe an electrically operated device that is capable of interacting with at least one aerosol-generating article including at least one aerosol-forming liquid such as to generate an aerosol by inductively heating the susceptor assembly and thus the aerosol-forming substrate within the article. Preferably, the aerosol-generating device is a puffing device for generating an aerosol that is directly inhalable by a user through the user's mouth. In particular, the aerosol-generating device is a hand-held aerosol-generating device.

The device may comprise a receiving cavity for removably receiving at least a portion of the aerosol-generating article.

The inductively heating aerosol-generating device may comprise at least one induction source configured and arranged to generate an alternating magnetic field in the receiving cavity in order to inductively aerosol-forming substrate in the aerosol-generating article, when the article is received in the aerosol-generating device.

For generating the alternating magnetic field, the induction source may comprise at least one inductor, preferably at least one induction coil arranged around the receiving cavity. The induction coil may be arranged such as to surround the susceptor assembly, that is, the one or susceptor particles, when the article is received in the receiving cavity.

The at least one induction coil may be a helical coil or flat planar coil, in particular a pancake coil or a curved planar coil. Use of a flat spiral coil allows a compact design that is robust and inexpensive to manufacture. Use of a helical induction coil advantageously allows for generating a homogeneous alternating magnetic field. As used herein a "flat spiral coil" means a coil that is generally planar, wherein the axis of winding of the coil is normal to the surface in which the coil lies. The flat spiral induction coil can have any desired shape within the plane of the coil. For example, the flat spiral coil may have a circular shape or may have a generally oblong or rectangular shape. However, the term "flat spiral coil" as used herein covers both, coils that are planar as well as flat spiral coils that are shaped to conform to a curved surface. For example, the induction coil may be a "curved" planar coil arranged at the circumference of a preferably cylindrical coil support, for example ferrite core. Furthermore, the flat spiral coil may comprise for example two layers of a four-turn flat spiral coil or a single layer of four-turn flat spiral coil. The at least one induction coil may be held within one of a main body or a housing of the aerosol-generating device.

The induction source may comprise an alternating current (AC) generator. The AC generator may be powered by a power supply of the aerosol-generating device. The AC generator is operatively coupled to the at least one induction coil. In particular, the at least one induction coil may be integral part of the AC generator. The AC generator is configured to generate a high frequency oscillating current to be passed through the at least one induction coil for generating an alternating magnetic field. The AC current may be supplied to the at least one induction coil continuously following activation of the system or may be supplied intermittently, such as on a puff by puff basis.

Preferably, the induction source comprises a DC/AC converter connected to the DC power supply including an LC network, wherein the LC network comprises a series connection of a capacitor and the inductor.

The induction source preferably is configured to generate a high-frequency magnetic field. As referred to herein, the high-frequency magnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

The aerosol-generating device may further comprise a controller configured to control operation of the heating process, preferably in a closed-loop configuration, in particular for controlling heating of the aerosol-forming liquid to a pre-determined operating temperature. The operating temperature used for heating the aerosol-forming substrate may be in a range between 200 degree Celsius and 360 degree Celsius, in particular between 160 degree Celsius and 240 degree Celsius. These temperatures are typical operating temperatures for heating but not combusting the aerosol-forming substrate.

The controller may be or may be art of an overall controller of the aerosol-generating device. The controller may comprise a microprocessor, for example a programmable microprocessor, a microcontroller, or an application specific integrated chip (ASIC) or other electronic circuitry capable of providing control. The controller may comprise further electronic components, such as at least one DC/AC inverter and/or power amplifiers, for example a Class-C power amplifier or a Class-D power amplifier or Class-E power amplifier. In particular, the induction source may be part of the controller.

The aerosol-generating device may comprise a power supply, in particular a DC power supply configured to provide a DC supply voltage and a DC supply current to the induction source. Preferably, the power supply is a battery such as a lithium iron phosphate battery. As an alternative, the power supply may be another form of charge storage device such as a capacitor. The power supply may require recharging, that is, the power supply may be rechargeable. The power supply may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the induction source.

The aerosol-generating device may further comprise a flux concentrator arranged around at least a portion of the induction coil and configured to distort the alternating magnetic field of the at least one inductive source towards receiving cavity. Thus, when the article is received in the receiving cavity, the alternating magnetic field is distorted towards the inductively heatable liquid conduit, if present. Preferably, the flux concentrator comprises a flux concentrator foil, in particular a multi-layer flux concentrator foil.

Further features and advantages of the aerosol-generating system according to the present invention have already been described with regard to the susceptor assembly and the aerosol-generating article according to the present invention and thus equally apply.

According to the invention, there is also provided method of manufacturing a susceptor assembly comprising one or more composite susceptor particles for inductively heating an aerosol-forming substrate, wherein each one of the one or more susceptor particle comprises a particle core and a particle shell entirely encapsulating the particle core. The method comprises:

- providing one or more particle cores comprising or being made of a ferromagnetic or ferrimagnetic core material;
- encasing each one of the one or more particle cores with an electrically conductive shell material such as to form a particle shell around each of the one or more particle cores.

As described further above with regard to the susceptor assembly according to present invention, the particle core may be a sintered particle core. Accordingly, providing the one or more particle cores may comprise:

- forming from the ferromagnetic or ferrimagnetic core material one or more green bodies having the shape corresponding to the shape of the particle core;
- sintering the one or more green bodies by heating the one or more green bodies.

As described further above with regard to the susceptor assembly according to present invention, the shell material may be plated, deposited, coated or cladded onto the particle core such as to form the particle shell. Accordingly, encasing each one of the one or more particle cores with an electrically conductive shell material may comprise plating, depositing, coating or cladding the shell material onto the one or more particle cores. In particular, the electrically conductive shell material may be applied onto the particle core by vapor deposition, rolling in slurry or in flat fluid bath, wherein the slurry and the flat fluid bath comprises the shell material to be applied.

Further features and advantages of the method according to the present invention have already been described above with regard to the susceptor assembly according to the present invention and equally apply.

The invention is defined in the claims. However, below there is provided a non-exhaustive list of non-limiting examples. Any one or more of the features of these examples may be combined with any one or more features of another example, embodiment, or aspect described herein.

Example Ex1: Susceptor assembly for inductively heating an aerosol-forming substrate under the influence of an alternating magnetic field, the susceptor assembly comprising one or more composite susceptor particles, wherein each one of the one or more susceptor particles comprises a particle core and a particle shell entirely encapsulating the particle core, wherein the particle core comprises or is made of a ferromagnetic or ferrimagnetic core material having a relative magnetic permeability of at least 200 at a frequency of 10 kHz (kilo-Hertz), in particular for frequencies up to 10 kHz (kilo-Hertz), and at a temperature of 20 degree Celsius, and wherein the particle shell comprises or is made of an electrically conductive shell material.

Example Ex2: Susceptor assembly according to example Ex1, wherein the shell material is paramagnetic.

Example Ex3: Susceptor assembly according to any one of the preceding examples, wherein the shell material is one of aluminum, stainless steel, electrically conductive carbon, or bronze.

Example Ex4: Susceptor assembly according to any one of the preceding examples, wherein the core material is electrically non-conductive.

Example Ex5: Susceptor assembly according to any one of the preceding examples, wherein the core material has a Curie temperature in a range between 160 degree Celsius and 400, in particular between 160 degree Celsius and 360 degree Celsius, preferably between 200 degree Celsius and 360 degree Celsius or between 160 degree Celsius and 240 degree Celsius.

Example Ex6: Susceptor assembly according to any one of the preceding examples, wherein the core material is a ferrite powder.

Example Ex7: Susceptor assembly according to any one of the preceding examples, wherein the core material is of a manganese-magnesium ferrite, a nickel-zinc ferrite or a cobalt-zinc barium ferrite.

Example Ex8: Susceptor assembly according to any one of the preceding examples, wherein each one of the one or more susceptor particles substantially has a ball shape.

Example Ex9: Susceptor assembly according to any one of the preceding examples, wherein each one of the one or more susceptor particles has an equivalent spherical particle diameter in a range between 10 micrometer and 500 micrometer, in particular between 20 micrometer and 250 micrometer, more particularly between 35 micrometer and 75 micrometer, for example 55 micrometer.

Example Ex10: Susceptor assembly according to any one of the preceding examples, wherein the particle core has an equivalent spherical core diameter in a range between 5 micrometer and 499 micrometer, in particular between 15 micrometer and 220 micrometer, more particularly between 30 micrometer and 55 micrometer, for example 35 micrometer.

Example Ex11: Susceptor assembly according to any one of the preceding examples, wherein the particle shell has a shell thickness in a range between 1 micrometer and 100 micrometer, in particular between 2.5 micrometer and 15 micrometer, more particularly between 5 micrometer and 12 micrometer, for example 10 micrometer.

Example Ex12: Susceptor assembly according to any one of the preceding examples, wherein the particle core is a sintered particle core, in particular wherein the core material is a sintered material.

Example Ex13: Susceptor assembly according to any one of the preceding examples, wherein the particle shell is in physical contact with the particle core.

Example Ex14: Susceptor assembly according to any one of the preceding examples, wherein the particle shell is firmly bonded to the particle core.

Example Ex15: Susceptor assembly according to any one of the preceding examples, wherein the shell material is plated, deposited, coated or cladded onto the particle core such as to form the particle shell.

Example Ex16: Aerosol-generating article for use with an inductively heating aerosol-generating device, wherein the article comprises at least one aerosol-forming substrate and a susceptor assembly according to any one of the preceding examples, wherein the one or more susceptor particles of the susceptor assembly are embedded in the aerosol-forming substrate, in particular distributed throughout the aerosol-forming substrate, for example, homogenously distributed or distributed with local concentration peaks or distributed with a distribution gradient, in particular from a central axis of the aerosol-forming article to the periphery thereof.

Example Ex17: Aerosol-generating system comprising an aerosol-generating article according to any one of the preceding examples and an inductively heating aerosol-generating device for use with the device.

Example Ex18: Method of manufacturing a susceptor assembly comprising one or more composite susceptor particles for inductively heating an aerosol-forming substrate, wherein each one of the one or more susceptor particle comprises a particle core and a particle shell entirely encapsulating the particle core, the method comprising:

- providing one or more particle cores comprising or being made of a ferromagnetic or ferrimagnetic core material;
- encasing each one of the one or more particle cores with an electrically conductive shell material such as to form a particle shell around each of the one or more particle cores.

Example Ex19: Method according to example Ex18, wherein providing the one or more particle cores comprises:

- forming from the ferromagnetic or ferrimagnetic core material one or more green bodies having the shape corresponding to the shape of the particle core;
- sintering the one or more green bodies by heating the one or more green bodies.

Example Ex20: Method according to any one of examples Ex18 or Ex19, wherein encasing each one of the one or more particle cores with an electrically conductive shell material comprises plating, depositing, coating or cladding the shell material onto the one or more particle cores.

Example Ex21: Method according to any one of examples Ex18 to Ex20, wherein encasing each one of the one or more particle cores with an electrically conductive shell material comprises applying the shell material onto the particle core by vapor deposition, rolling in slurry or in flat fluid bath, wherein the slurry and the flat fluid bath comprises the shell material to be applied.

Figure 3:
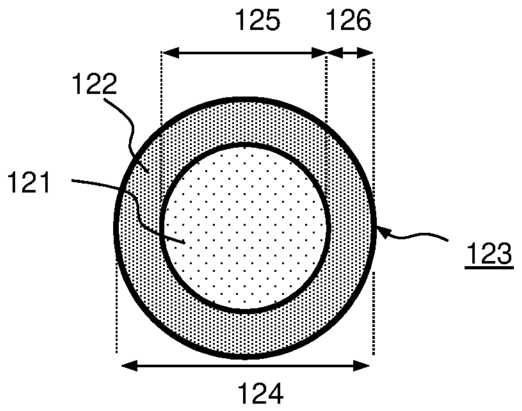
Figure 4:
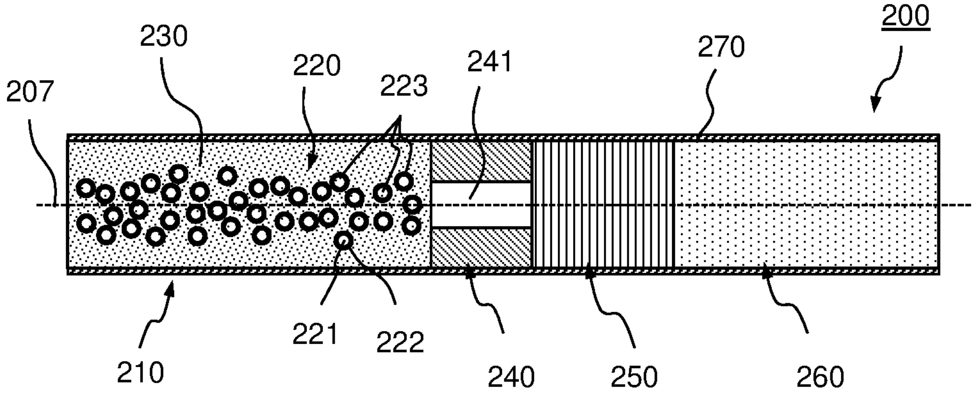
Figure 2:
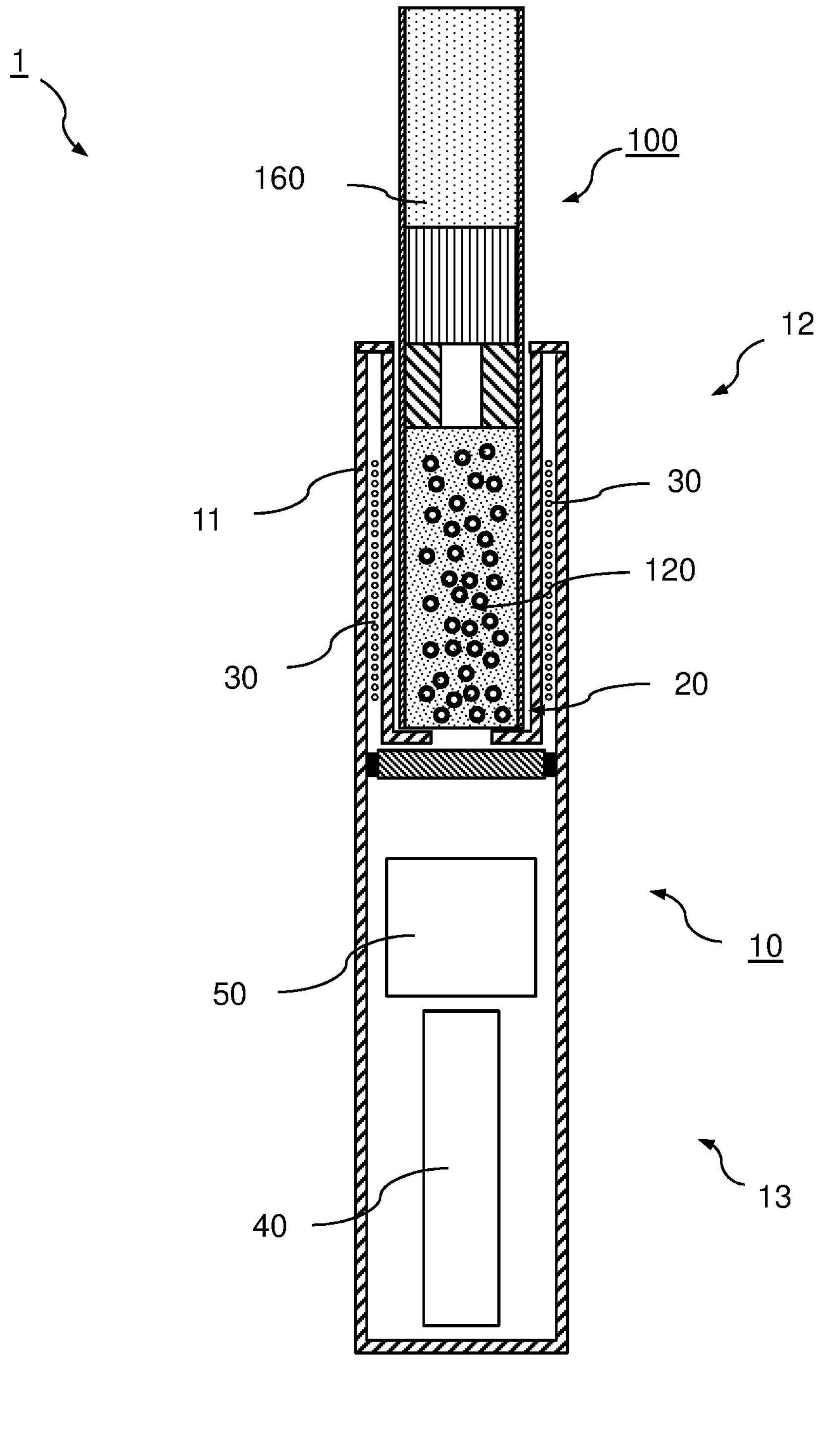

Examples will now be further described with reference to the figures in which:

FIG. 1 schematically illustrates an inductively heatable aerosol-generating article according to a first exemplary embodiment of the present invention comprising a susceptor assembly;

FIG. 2 schematically illustrates an exemplary embodiment of an aerosol-generating system comprising an aerosol-generating device and the aerosol-generating article according to FIG. 1;

FIG. 3 shows one susceptor particle of the susceptor assembly included in the aerosol-generating article according to FIG. 1; and FIG. 4 schematically illustrates an inductively heatable aerosol-generating article according to a second exemplary embodiment of the present invention.

FIG. 1 schematically illustrates a first exemplary embodiment of an inductively heatable aerosol-generating article 100 according to the present invention. The aerosol-generating article 100 substantially has a rod-shape and comprises four elements which are sequentially arranged in coaxial alignment: an aerosol-forming rod segment 110, a support element 140 having a central air passage 141, an aerosol-cooling element 150, and a filter element 160 which serves as a mouthpiece. The aerosol-forming rod segment 110 is arranged at a distal end 102 of the article 100, whereas the filter element 160 is arranged at a distal end 103 of the article 100. Each of these four elements is a substantially cylindrical element, all of them having substantially the same diameter. In addition, the four elements are circumscribed by an outer wrapper 170 such as to keep the four elements together and to maintain the desired circular cross-sectional shape of the rod-like article 100. The wrapper 170 preferably is made of paper.

As regard the present invention, the aerosol-forming rod segment 110 comprises an aerosol-forming substrate 130 as well as a susceptor assembly 120 for heating the substrate 130 when being exposed to an alternating magnetic field. As can be seen in FIG. 1, the susceptor assembly 120 comprises a plurality of susceptor particles 123 which are equally distributed throughout the aerosol-forming substrate 130. Due to their particulate nature, the susceptor particles 123 present a large surface area to the surrounding aerosol-forming substrate 130 which advantageously enhances heat transfer. Details of the susceptor particles 123 will be described in more detail 123 further below with regard to FIG. 3

As illustrated in FIG. 2, the aerosol-generating article 100 is configured for use with an inductively heating aerosol-generating device 10. Together, the device 10 and the article 100 form an aerosol-generating system 1 according to the present invention. The aerosol-generating device 10 comprises a cylindrical receiving cavity 20 defined within a proximal portion 12 of the device 10 for receiving a least a distal portion of the article 100 therein. The device 10 further comprises an induction source including an induction coil 30 for generating an alternating high-frequency magnetic field. In the present embodiment, the induction coil 30 is a helical coil circumferentially surrounding the cylindrical receiving cavity 20. The coil 30 is arranged such that the susceptor assembly 120 of the aerosol-generating article 100 experiences the alternating magnetic field upon engaging the article 100 with the device 10. Thus, when activating the induction source, the susceptor assembly 120 heats up due induction heating. As will be described in more detail 123 further below with regard to FIG. 3, the susceptor assembly 120 is heated until reaching an operating temperature sufficient to vaporize the aerosol-forming substrate 130 in the aerosol-forming rod segment 110. Within a distal portion 13, the aerosol-generating device 10 further comprises a DC power supply 40 and a controller 50 (illustrated in FIG. 2 schematically only) for powering and controlling the heating process. Apart from the induction coil 30, the induction source preferably is at least partially integral part of the controller 50 of the device 10.

FIG. 3 shows a detailed cross-sectional view through one of the susceptor particles 123 of used within the aerosol-generating article shown in FIG. 1. According to the invention, each one of the susceptor particles 123 comprises a particle core 121 and a particle shell 122 entirely encapsulating the particle core 121. The particle core 121 comprises or is made of a ferromagnetic or ferrimagnetic core material having a relative magnetic permeability of at least 200 for frequencies up to 10 kHz (kilo-Hertz) at a temperature of 20 degree Celsius. In the present embodiment, the particle core 121 is made of a nickel-zinc ferrite, that is, of an electrically non-conductive ferrimagnetic material. In contrast, the particle shell 122 is made of an electrically conductive shell material. In the present embodiment, the particle shell 122 is made of aluminium, which is paramagnetic. Hence, in general, when exposed to the alternating magnetic field of the induction coil 32, the particle shell 122 heats up due to eddy currents, whereas the particle core 121 heats up due to hysteresis losses.

According to the present invention, the magnetic core has another important function: Due its high magnetic permeability, the particle 121 acts as a flux concentrator which increases the magnetic flux through the particle shell 122. According to Faraday's law of induction, an increase of the magnetic flux causes an increase of eddy current losses in the particle shell 122. Hence, the high magnetic permeability of the magnetic particle core 121 increases the amount of heat generated in particle shell during use. Advantageously, this also allows to make the particle shell rather thin, and thus to save material and costs for the manufacturing of the susceptor particles.

When reaching about the Curie temperature of the core material, the magnetic properties of the particle core 121 change from ferrimagnetic to paramagnetic. As a consequence, the overall effective magnetic permeability of the magnetic particle core 121 drops to unity. This causes the heat generation in the particle core 121 to stop as the magnetic hysteresis of the core material disappears. Even more, the change in the magnetic permeability also affects the heat generation in the particle shell 122 as the decrease of the magnetic permeability of the magnetic particle core 121 causes a decrease of the magnetic flux through the electrically conductive particle shell 122. This in turn leads to a reduction of the electromotive force and thus to a reduction of heat generating eddy current losses in the particle shell 122, when the susceptor assembly reaches the Curie temperature of the core material.

In addition, the change in the magnetic permeability affects the heat generation in the particle shell 122 also because the decrease of the magnetic permeability causes an increase of the skin depth in the particle shell 122 as described further above. This in turn causes the effective resistance of the aluminum particle shell 122 to decrease. Hence, when reaching the Curie temperature of the core material, heat generation in the particle shell 122 is also reduced since the decrease of the effective resistance also causes a reduction of eddy current losses in the shell material.

Accordingly, at the Curie temperature, the heat generation by eddy current losses in the particle shell 122 is reduced due to both, a reduction of the magnetic flux through the particle shell and a reduction of the effective resistance of the shell material. In addition, the overall heat generation is reduced due to the hysteresis losses in the particle core 121 disappearing at the Curie temperature of the core material. In particular, the reduction of the overall heat generation results by itself, so that rapid overheating of the as aerosol-forming substrate can be effectively avoided, preferably without the need for an active temperature control.

Preferably, the specific core material is chosen such as to have a Curie temperature at about a predefined operating temperature of the susceptor assembly 120 at which the aerosol-forming substrate 130 is to be heated. For solid aerosol forming substrates containing tobacco material, the operating temperature may be in a range between 200 degree Celsius and 360 degree Celsius.

As be further seen in FIG. 3, the susceptor particle 123 substantially has a ball shape. The particle diameter 124 may be in a range between 50 micrometer and 75 micrometer. In the present embodiment, the mean particle diameter of all susceptor particles 123 is about 555 micrometer which results from the particle core 121 having a core diameter 125 of about 35 micrometer, and the particle shell 122 having a shell thickness 126 of about 10 micrometer.

The particle core may be manufactured may sintering a green body of the ferromagnetic or ferrimagnetic core material, and subsequently applying the shell material onto the particle core 121, for example, by vapor deposition such as to provide a particle shell 122 that is firmly bonded to the particle core 121.

FIG. 4 shows a second embodiment of an aerosol-generating article 200 according to the present invention. In general, the aerosol-generating article 200 according to FIG. 4 is very similar to the aerosol-generating article 100 shown in FIG. 1 and FIG. 2. Therefore, identical or similar features are denoted with the same reference signs, yet incremented by 100. In contrast to the first embodiment shown in FIG. 1, the article 400 according to FIG. 4 has a particle distribution of the susceptor particles 223 with a distribution gradient from a central axis 207 of the aerosol-forming article 200 to the periphery thereof, in particular with a local concentration maximum along the center axis 207 of the article 200, in order to have the aerosol-forming substrate 230 mainly heated in a center portion of rod segment 210.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±5 percent of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. A susceptor assembly for inductively heating an aerosol-forming substrate under an influence of an alternating magnetic field, the susceptor assembly comprising:

one or more composite susceptor particles, wherein each one of the one or more composite susceptor particles comprises a particle core and a particle shell entirely encapsulating the particle core, wherein the particle core comprises or is made of a ferromagnetic or ferrimagnetic core material having a relative magnetic permeability of at least 200 for frequencies up to 10 kHz at a temperature of 20 degrees Celsius, and wherein the particle shell comprises or is made of an electrically conductive shell material.

2. The susceptor assembly according to claim 1, wherein a material of the particle shell is paramagnetic.

3. The susceptor assembly according to claim 1, wherein a material of the particle shell is one of aluminum, stainless steel, electrically conductive carbon, or bronze.

4. The susceptor assembly according to claim 1, wherein a material of the core is electrically non-conductive.

5. The susceptor assembly according to claim 1, wherein a material of the core has a Curie temperature in a range between 160 degrees Celsius and 400 degrees Celsius.

6. The susceptor assembly according to claim 1, wherein a material of the core has a Curie temperature in a range between 160 degrees Celsius and 240 degrees Celsius.

7. The susceptor assembly according to claim 1, wherein a material of the core is a ferrite powder.

8. The susceptor assembly according to claim 1, wherein a material of the core is of a manganese-magnesium ferrite, a nickel-zinc ferrite, or a cobalt-zinc barium ferrite.

9. The susceptor assembly according to claim 1, wherein each one of the one or more composite susceptor particles substantially has a ball shape.

10. The susceptor assembly according to claim 1, wherein each one of the one or more composite susceptor particles has an equivalent spherical particle diameter in a range between 10 micrometers and 500 micrometers.

11. The susceptor assembly according to claim 1, wherein each one of the one or more composite susceptor particles has an equivalent spherical particle diameter in a range between 35 micrometers and 75 micrometers.

12. The susceptor assembly according to claim 1, wherein the particle core has an equivalent spherical core diameter in a range between 5 micrometers and 499 micrometers.

13. The susceptor assembly according to claim 1, wherein the particle core has an equivalent spherical core diameter in a range between 30 micrometers and 55 micrometers.

14. The susceptor assembly according to claim 1, wherein the particle shell has a shell thickness in a range between 1 micrometer and 100 micrometers.

15. The susceptor assembly according to claim 1, wherein the particle shell has a shell thickness in a range between 5 micrometers and 12 micrometers.

16. The susceptor assembly according to claim 1, wherein the particle core is a sintered particle core, and wherein a material of the particle core is a sintered material.

17. The susceptor assembly according to claim 1, wherein a material of the particle shell is plated, deposited, coated, or cladded onto the particle core such as to form the particle shell.

18. An aerosol-generating article for an inductively heating aerosol-generating device, the aerosol-generating article comprising:

at least one aerosol-forming substrate and a susceptor assembly according to claim 1, wherein the one or more susceptor particles of the susceptor assembly are embedded in the aerosol-forming substrate.

19. The aerosol-generating article according to claim 18, wherein the one or more susceptor particles of the susceptor assembly are distributed throughout the aerosol-forming substrate with a distribution gradient from a central axis of the aerosol-generating article to a periphery thereof.

20. An aerosol-generating system comprising the aerosol-generating article according to claim 18 and an inductively heating aerosol-generating device for the inductively heating aerosol-generating device.

* * * * *